United States Patent
Miyako et al.

(10) Patent No.: US 10,454,400 B2
(45) Date of Patent: Oct. 22, 2019

(54) ELECTROMECHANICAL DEVICE PROVIDED WITH CONTROLLED MOTOR AND ROTATION CONTROL METHOD

(71) Applicant: ALPS ALPINE CO., LTD., Tokyo (JP)

(72) Inventors: Ikuyasu Miyako, Miyagi (JP); Wataru Kimura, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 15/972,551

(22) Filed: May 7, 2018

(65) Prior Publication Data

US 2018/0254723 A1 Sep. 6, 2018

Related U.S. Application Data

(63) Continuation of application No. PCT/JP2016/081948, filed on Oct. 27, 2016.

(30) Foreign Application Priority Data

Nov. 9, 2015 (JP) .................................. 2015-219460

(51) Int. Cl.
*H02P 6/20* (2016.01)
*H02P 6/17* (2016.01)
(Continued)

(52) U.S. Cl.
CPC ............... *H02P 6/20* (2013.01); *G05G 1/087* (2013.01); *H02P 1/029* (2013.01); *H02P 6/17* (2016.02); *H02P 2205/07* (2013.01)

(58) Field of Classification Search
USPC .................................................... 318/400.11
See application file for complete search history.

(56) References Cited

U.S. PATENT DOCUMENTS 6,591,175 B2 * 7/2003 Numata ............... G05B 19/106
701/36
7,511,444 B2 * 3/2009 Nakai ..................... F16H 61/32
180/65.6
(Continued)

FOREIGN PATENT DOCUMENTS

EP          1220068        7/2002
JP       2002-345294      11/2002
(Continued)

OTHER PUBLICATIONS

Extended European Search Report for 16864036.5 dated Oct. 16, 2018.
(Continued)

*Primary Examiner* — Jorge L Carrasquillo
(74) *Attorney, Agent, or Firm* — IPUSA, PLLC

(57) ABSTRACT

When a rotation start position of a rotation shaft 132 is a middle start position 31*a* (i.e., when rotation of the rotation shaft 132 is stopped in the middle and the rotation is restarted), target rotational speed (relative target rotational speed) is defined using a relative pattern 31 that uses the middle start position 31*a* as a reference, without using an absolute pattern 33 that is defined using a normal rotation start position 33*a* as a reference. Upon detecting that a condition that absolute target rotational speed corresponding to an angular position detected by a rotation sensor 134 is greater than the relative target rotational speed is not satisfied, motor control is switched so that the absolute pattern 33 is used.

4 Claims, 10 Drawing Sheets

(51) Int. Cl.
*H02P 1/02* (2006.01)
*G05G 1/08* (2006.01)

(56) References Cited

U.S. PATENT DOCUMENTS

2006/0137136 A1* 6/2006 Imai .................. E05F 15/632
                                                                        16/52
2007/0075655 A1 4/2007 VanDrunen et al.

FOREIGN PATENT DOCUMENTS

| JP | 2007-209179 | 8/2007 |
| JP | 2011-130596 | 6/2011 |
| JP | 2015-116626 | 6/2015 |

OTHER PUBLICATIONS

International Search Report dated Jan. 24, 2017 in PCT/JP2016/081948 filed on Oct. 27, 2016.

* cited by examiner

ELECTROMECHANICAL DEVICE PROVIDED WITH CONTROLLED MOTOR AND ROTATION CONTROL METHOD

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/081948 filed on Oct. 27, 2016, designating the U.S., which claims priority based on Japanese Patent Application No. 2015-219460 filed on Nov. 9, 2015. The entire contents of each of the foregoing applications are incorporated herein by reference.

BACKGROUND

Technical Field

The present disclosure relates to an electromechanical device provided with a controlled motor, a motor controller, and a rotation control method.

Description of Related Art

An electromechanical device in which a motor is installed causes various components to operate by rotation of a rotation shaft of the motor. For example, a shift device installed in a vehicle, which is a type of an electromechanical device, switches a transmission in response to an operation of an operation knob. Such an electromechanical device includes a device such that, upon an ignition switch being turned on, an operation knob that is stored on a surface that is approximately the same as a surface of an operations panel protrudes from the operations panel. The movement of the operation knob is achieved by converting rotation of a motor into a translational movement. It is required to move the operation knob to a home position within a predetermined time, as the operation knob is indispensable for driving the vehicle.

According to Patent Document 1 (Japanese Unexamined Patent Publication No. 2002-345294), at a start of operation, a soft start is performed by increasing a drive duty ratio at a fixed rate, and, upon detecting that soft start termination determination speed is reached that is set to be lower than target speed, the operation transitions to constant speed control. It is disclosed that, for this speed control, when a motor is accelerated, an actual drive current control output value and a drive electric current at that time are detected by using a control pattern in which relation between a drive control output value and a drive electric current of a motor is mapped, and the speed is controlled by comparing an output value of the drive electric current based on the mapping with a determination value.

Additionally, Patent Document 2 (Japanese Unexamined Patent Publication No. 2007-209179) discloses a motor control method such that the motor moves at a constant high speed during movement, and the motor quickly and gently stops when it is to be stopped.

SUMMARY

In the above-described related art, when the operation is started from an upper end or a lower end of a movement range of the operation knob, there is no problem for controlling the speed using the above-described mapped pattern, etc. However, during movement, when the operation knob is caused to stop by a factor, such as an application of external force, and then the movement is restarted, movement is started at a speed that is higher than the speed at a normal start of the movement at a movement restart position, if the target speed is used as it is, which corresponds to the normal movement start position that is defined by the above-described pattern. Furthermore, an acceleration curve characteristic required for starting the movement is not obtained at the movement start position.

As a result, a speed tracking error at the restart of the movement of the operation knob increases and a large electric current flows, and a problem is that high performance is required for a drive circuit. Further, large torque is applied at the restart of the operation knob, and a problem is that a collision noise of components, such as gears inside the electromechanical device, is generated. In an environment in which a person is located in the vicinity, or in a quiet environment that is closed, small collision sound may be perceived as noise. Accordingly, there is a need for suppressing sound at a restart of an electromechanical device, even if a volume of the sound is small.

The present disclosure is achieved in view of such a circumstance, and an object is to provide an electromechanical device provided with a controlled motor, a motor controller, and a rotation control method that can execute rotation control using appropriate target rotational speed, even if the rotation is to be restarted at a middle start position.

In order to solve the above-described problem, an electromechanical device provided with a controlled motor according to the present disclosure includes a motor that includes a rotation shaft and that applies, to the rotation shaft, a torque toward an angular position in accordance with control; a rotation sensor that detects the angular position of the rotation shaft; and a motor controller that controls rotational speed of the rotation shaft depending on the angular position detected by the rotation sensor, wherein the motor controller determines, based on a detection result by the rotation sensor, whether a rotation start position of the rotation shaft is a predetermined normal rotation start position, wherein, upon determining that the rotation start position is a middle start position other than the normal rotation start position, the motor controller controls the motor using a relative pattern that defines, using the middle start position as a reference, relation between the angular position and relative target rotational speed, so that the relative target rotational speed corresponding to the detected angular position is achieved, and wherein the motor controller uses an absolute pattern that defines, using the normal rotation start position as a reference, relation between the angular position and an absolute target rotational speed to identify the absolute target rotational speed corresponding to the detected angular position, wherein, upon detecting that a condition that the identified absolute target rotational speed is greater than the relative target rotational speed corresponding to the detected angular position is not satisfied, the motor controller controls the motor using the absolute pattern, so that the absolute target rotational speed corresponding to the angular position is achieved.

According to this configuration, when the rotation start position of the rotation shaft is the middle start position (namely, when the rotation of the rotation shaft is stopped in the middle and it is restarted), the target rotational speed (the relative target rotational speed) is defined using the relative pattern with the middle start position as the reference, without using the absolute pattern defined with the normal rotation start position as the reference. Accordingly, by defining an appropriate pattern as the relative pattern, the absolute target rotational speed that is high speed defined by the absolute pattern is not used at the middle start position, so that it can be prevented that a large electric current flows, and that the speed tracking error can be reduced, using the relative target rotational speed that is low speed. Furthermore, it is possible to lower the level of the specification required for the drive circuit. Furthermore, if a gear is connected to the rotation shaft, it can be suppressed that a large torque is rapidly generated and the gear starts rotating at high speed, so that collision sound can be suppressed. Namely, if the absolute pattern is used at the middle start position, an acceleration curve characteristic at the start is insufficient and the initial target rotational speed becomes large. According to the present disclosure, such a problem can be solved.

Further, according to this configuration, while performing rotation control using the relative pattern, upon detecting that the condition that the absolute target rotational speed corresponding to the detected angular position is greater than the relative target rotational speed is not satisfied, the motor control is switched, so that the absolute pattern is used. Accordingly, after the relative target rotational speed reaches the absolute target rotational speed, the target rotational speed can be made identical to that of a case in which the rotation of the rotation shaft does not stop in the middle. As a result, the target rotational speed in the vicinity of the position at which the rotation is stopped can be made constant.

Preferably, upon determining that the rotation start position of the rotation shaft is the normal rotation start position based on the detection result by the rotation sensor, the motor controller of the electromechanical device provided with the controlled motor according to the present disclosure controls the motor using the absolute pattern, so that the absolute target rotational speed corresponding to the detected angular position is achieved.

According to this configuration, when the rotation start position of the rotation shaft is the normal rotation start position, the motor can be controlled using the absolute pattern, without using the relative pattern.

Preferably, in the electromechanical device provided with the controlled motor according to the present disclosure, a maximum target rotational speed and acceleration until the maximum target rotational speed is achieved are identical for the relative pattern and for the absolute pattern. According to this configuration, even if the relative pattern and the absolute pattern are switched, the change in the target rotational speed can be smoothed.

Preferably, in the electromechanical device provided with the controlled motor according to the present disclosure, an increment start angular position of the relative target rotational speed in the relative pattern is greater than an increment start angular position of the absolute target rotational speed in the absolute pattern, and a decrement start angular position from the maximum target rotational speed of the relative target rotational speed in the relative pattern is greater than a decrement start angular position from the maximum target rotational speed of the absolute target rotational speed in the absolute pattern. According to this configuration, the relative target rotational speed that is lower than the absolute target rotational speed defined by the absolute pattern can be used at the middle start position, and a large electric current can be prevented from flowing and the speed tracking error can be reduced.

Preferably, in the electromechanical device provided with the controlled motor according to the present disclosure, the relative pattern is created using the absolute pattern. According to this configuration, the relative pattern can be created using the absolute pattern, and it can be implemented by a simple and inexpensive configuration.

Preferably, in the electromechanical device provided with the controlled motor according to the present disclosure, the relative pattern and the absolute pattern have identical shapes. According to this configuration, the relative pattern can be created using the absolute pattern, and it can be implemented by a simple and inexpensive configuration.

Preferably, the electromechanical device provided with the controlled motor according to the present disclosure, further includes an operation knob; and a moving system that moves the operation knob along a predetermined path as the rotation shaft rotates, and a transmission is switched by the operation knob. According to this configuration, when the operation knob stops in the middle of movement by the moving system due to application of external force, and the movement is restarted, a large electric current can be prevented from flowing. Additionally, it can be suppressed that rapid rotation, etc., is generated and collision sound is generated in the moving system.

Preferably, the relative pattern and the absolute pattern of the electromechanical device provided with the controlled motor according to the present disclosure are defined so that all required specifications on a target position arrival time from the normal rotation start position to a normal rotation end position of the operation knob, noise, a stopping precision, and a drive electric current are satisfied.

A motor controller according to the present disclosure is a motor controller for controlling a motor that includes a rotation shaft and that applies, to the rotation shaft, a torque toward an angular position in accordance with control, the motor controller including a rotation sensor that detects the angular position of the rotation shaft; and a motor controller that controls rotational speed of the rotation shaft depending on the angular position detected by the rotation sensor, wherein the motor controller determines, based on a detection result by the rotation sensor, whether a rotation start position of the rotation shaft is a predetermined normal rotation start position, wherein, upon determining that the rotation start position is a middle start position other than the normal rotation start position, the motor controller controls the motor using a relative pattern that defines, using the middle start position as a reference, relation between the angular position and relative target rotational speed, so that the relative target rotational speed corresponding to the detected angular position is achieved, and wherein the motor controller uses an absolute pattern that defines, using the normal rotation start position as a reference, relation between the angular position and an absolute target rotational speed to identify the absolute target rotational speed corresponding to the detected angular position, wherein, upon detecting that a condition that the identified absolute target rotational speed is greater than the relative target rotational speed corresponding to the detected angular position is not satisfied, the motor controller controls the motor using the absolute pattern, so that the absolute target rotational speed corresponding to the detected angular position is achieved.

A motor control method according to the present disclosure is a motor control method for controlling rotational speed of a motor that includes a rotation shaft and that applies, to the rotation shaft, a torque toward an angular position in accordance with control, the motor control method including: determining, based on a detection result by a rotation sensor that detects the angular position of the rotation shaft, whether a rotation start position of the rotation shaft is a predetermined normal rotation start position, wherein, upon determining that the rotation start position is a middle start position other than the normal rotation start position, controlling the motor using a relative pattern that defines, using the middle start position as a reference, relation between the angular position and relative target rotational speed, so that the relative target rotational speed corresponding to the detected angular position is achieved; identifying the absolute target rotational speed corresponding to the detected angular position, using an absolute pattern that defines, using the normal rotation start position as a reference, relation between the angular position and an absolute target rotational speed; and upon detecting that a condition that the identified absolute target rotational speed is greater than the relative target rotational speed corresponding to the detected angular position is not satisfied, controlling the motor using the absolute pattern, so that the absolute target rotational speed corresponding to the detected angular position is achieved.

According to the present disclosure, there can be provided an electromechanical device provided with a controlled motor, a motor controller, and a rotation control method that can execute rotation control using an appropriate target rotational speed, even if the rotation is to be restarted at a middle start position.

DETAILED DESCRIPTION

An electromechanical device 100 provided with a controlled motor according to an embodiment is an electronic shifter provided with functions for raising, lowering, and rotating an operation knob. Speed curve control of a motor for the raising and lowering drive is executed in a condition in which parameters are optimized, and, in the speed curve control, even if raising and lowering of the operation knob is restarted at any position, no large torque is rapidly generated, and the operation knob can be accurately positioned at a predetermined position.

(Configuration)

Figure 1:
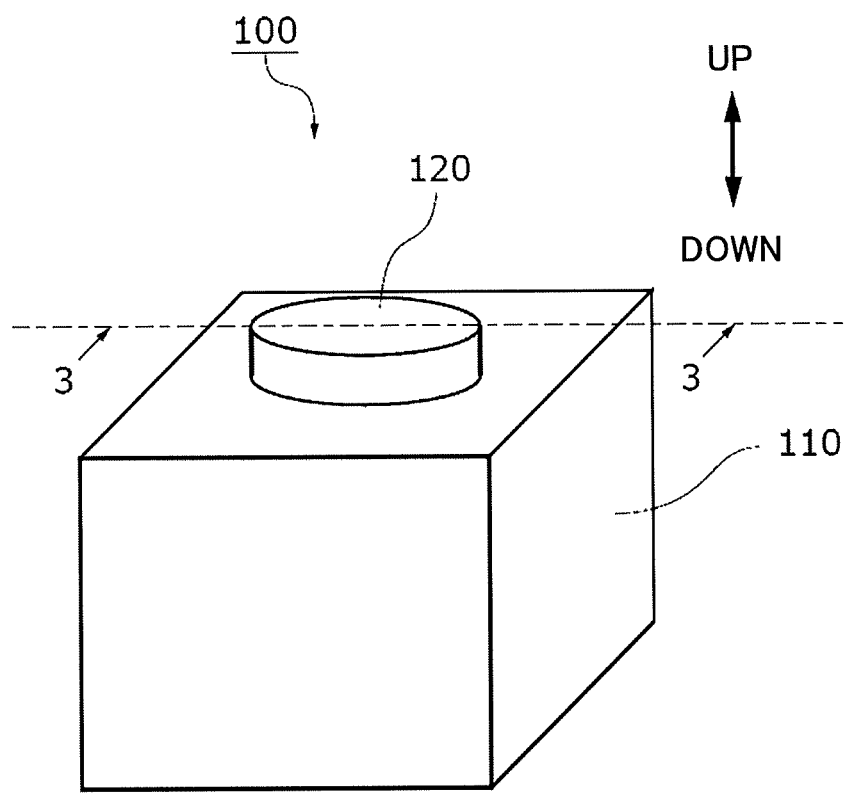
FIG. 1 is a perspective view of an electromechanical device provided with a controlled motor according to an embodiment of the present disclosure.
Figure 2:
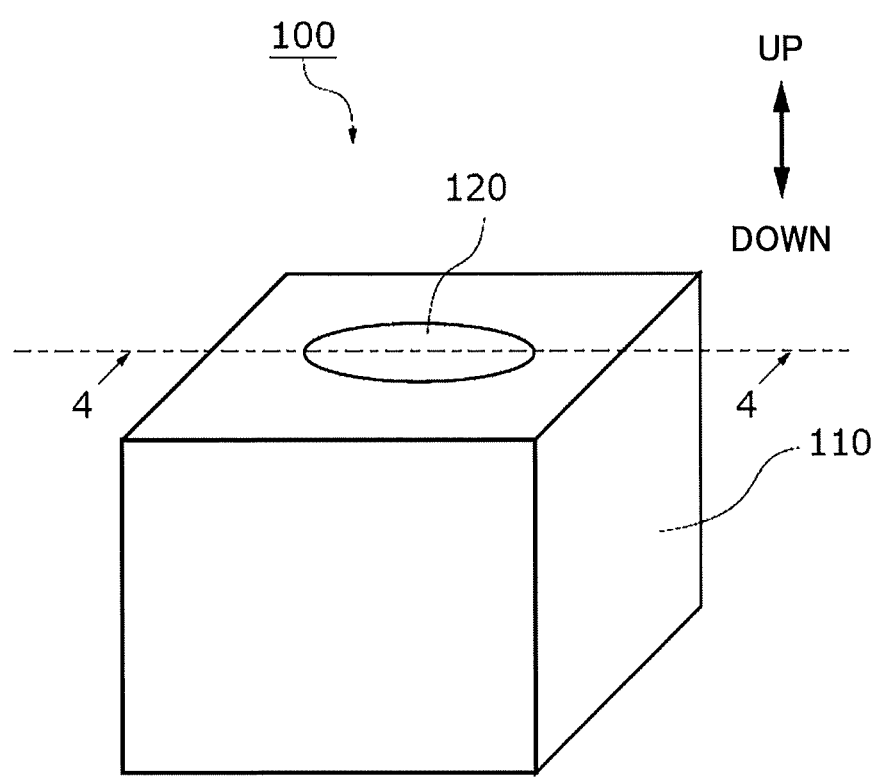
FIG. 2 is another perspective view of the electromechanical device provided with the controlled motor of FIG. 1.

In the following, an electromechanical device provided with a controlled motor according to the embodiment of the present disclosure is described. FIG. 1 and FIG. 2 are perspective views illustrating different states of the electromechanical device 100 provided with the controlled motor according to the embodiment, respectively. The electromechanical device 100 provided with the controlled motor is a shift device installed in a vehicle, which is not depicted. An up and down direction in the embodiment is defined for convenience of the description, and the up and down direction does not limit an actual use direction.

Figure 3:
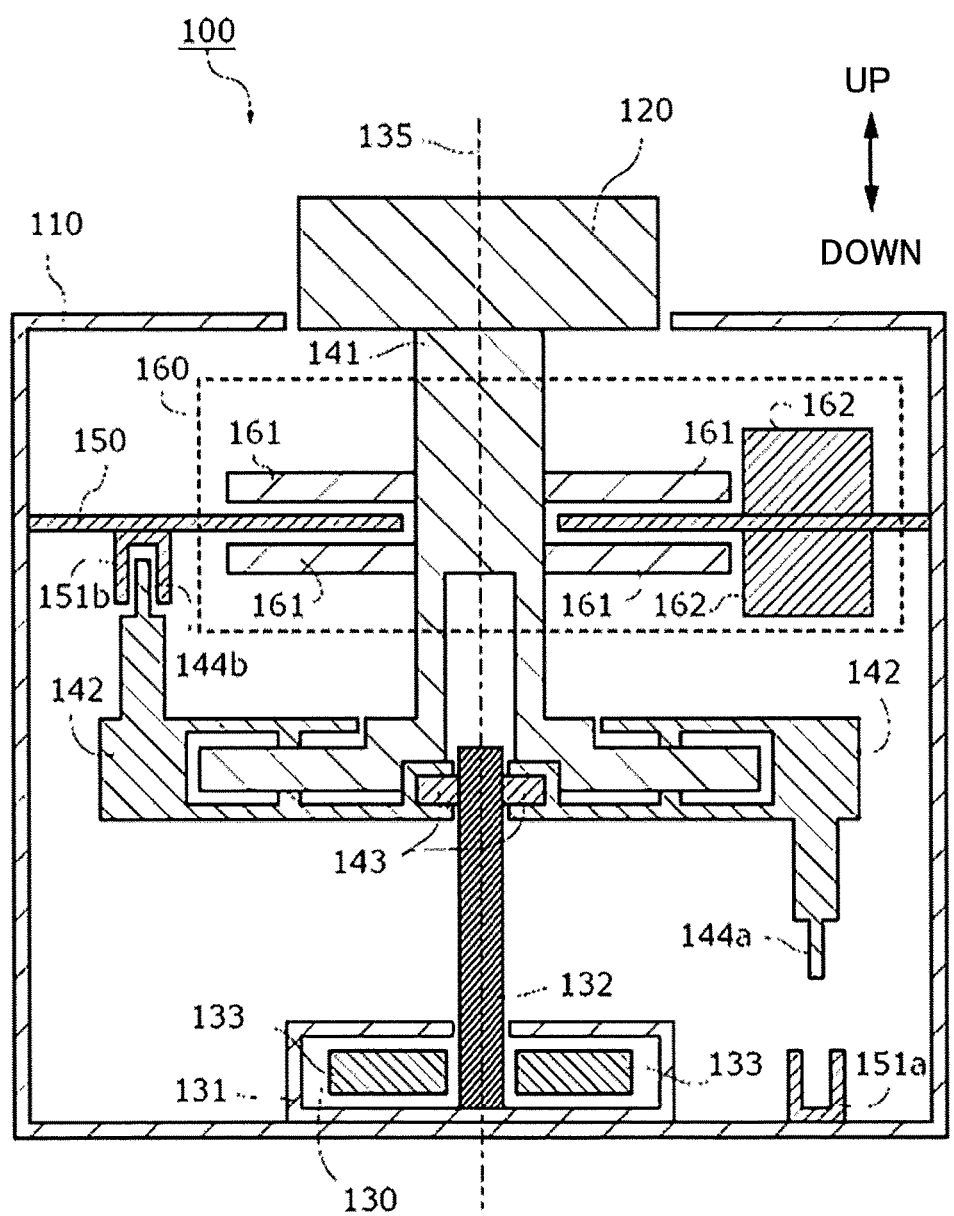
FIG. 3 is a cross-sectional view along a line 3-3 of the electromechanical device provided with the controlled motor of FIG. 1.
Figure 4:
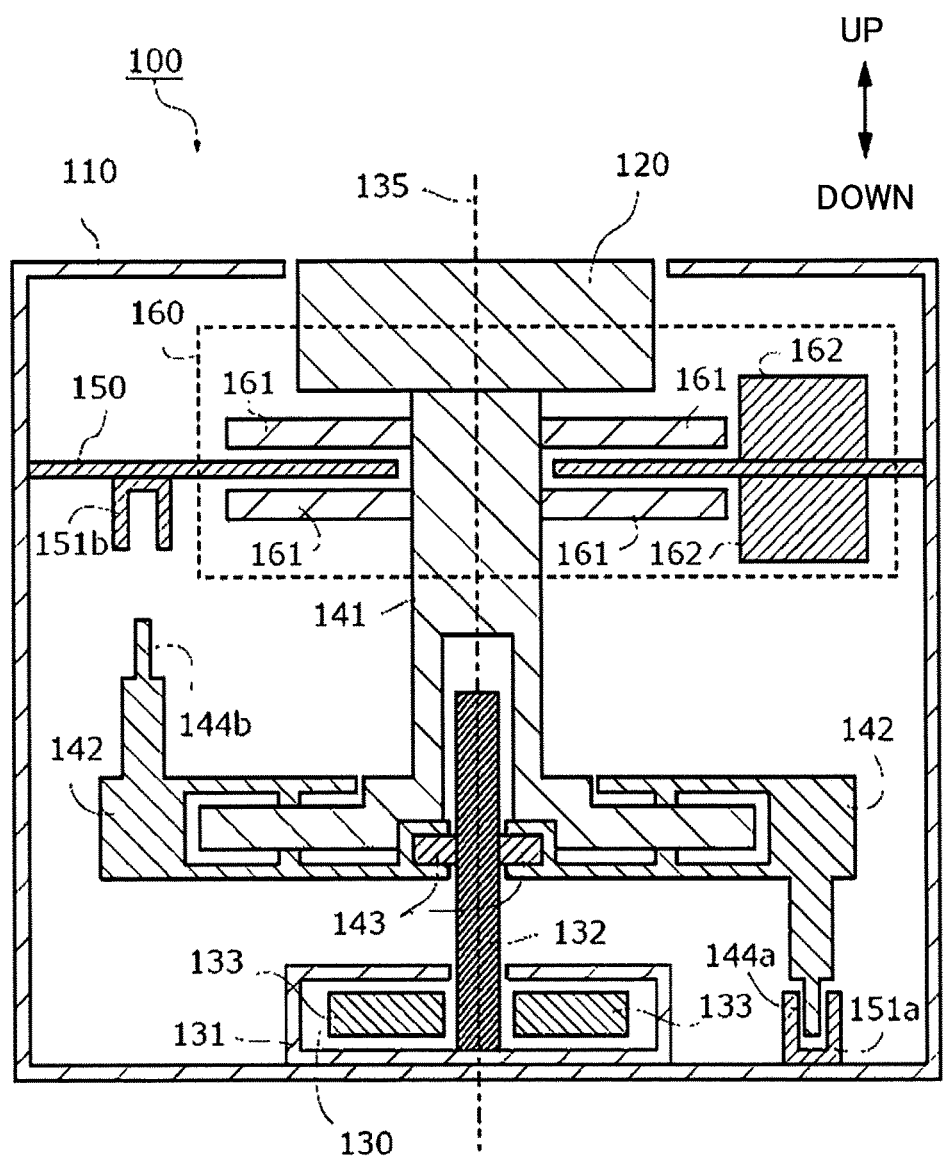
FIG. 4 is a cross-sectional view along a line 4-4 of the electromechanical device provided with the controlled motor of FIG. 2.

FIG. 3 is a schematic cross-sectional view of the electromechanical device 100 provided with the controlled motor of FIG. 1, in which an operation knob 120 is at a protruding position, that is obtained by cutting the electromechanical device 100 of FIG. 1 with a plane including a line 3-3 and a vertical direction that is a moving direction of the operation knob 120 and viewing it in the direction of the arrows. FIG. 4 is a schematic cross-sectional view of the electromechanical device 100 provided with the controlled motor of FIG. 2, in which the operation knob 120 is at a retracted position, that is obtained by cutting the electromechanical device 100 of FIG. 2 by a plane including a line 4-4 and the vertical direction of the operation knob 120 and viewing it in the direction of the arrows.

As illustrated in FIG. 1, the electromechanical device 100 provided with the controlled motor is provided with a case body 110 and the operation knob 120. Except for the operation knob 120, components of the electromechanical device 100 provided with the controlled motor are accommodated inside the case body 110. The case body 110 may be omitted.

Upon receiving user's rotational operation, the operation knob 120 switches a transmission. The operation knob 120 moves between the protruding position of FIG. 1 at which the operation knob 120 protrudes upward from the case body 110 and the retracted position illustrated in FIG. 2 at which the operation knob 120 is accommodated in the case body 110. For example, when an ignition switch, which is not depicted, of a vehicle is turned on, the operation knob 120 moves from the retracted position of FIG. 2 to the protruding position of FIG. 1, and, when the ignition switch is turned off, the operation knob 120 moves from the protruding position of FIG. 1 to the retracted position of FIG. 2.

As illustrated in FIG. 3, the electromechanical device 100 provided with the controlled motor includes a motor 130. The motor 130 according to the embodiment is a 4-pole/6-slot three-phase brushless motor; however, the motor 130 may be another brushless motor, or another motor, such as a stepping motor. The motor 130 includes a cover 131; a rotation shaft 132 protruding upward from inside the cover 131 to outside the cover 131; and a stator 133 disposed around the rotation shaft 132 in the cover 131. Grooves are formed on a cylindrical circumferential curved surface of the rotation shaft 132, so that it can function as a warm gear.

Figure 5:
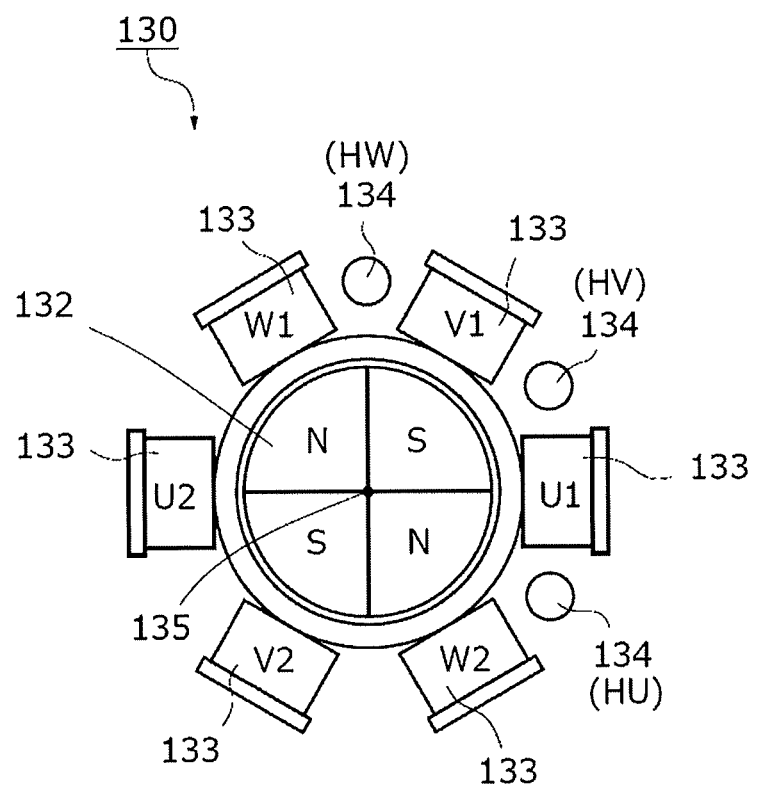
FIG. 5 is a conceptual diagram illustrating an arrangement of a part of components of a motor.

FIG. 5 is a conceptual diagram illustrating an arrangement of a part of the components of the motor 130 when the part of the components of the motor 130 is viewed from above. The rotation shaft 132 rotates around a virtual center line 135 along the vertical direction. At a lower end of the rotation shaft 132, there are magnets in which four poles of NSNS are evenly arranged in a rotation direction, and the rotation shaft 132 functions as a rotor. Six coils (U1, V1, W1, U2, V2, and W2) are arranged around the rotor as a six-slot stator 133. The coil U1, coil V1, coil W1, coil U2, coil V2, and coil W2 are arranged counterclockwise around the center line 135 in this order at 60 degree intervals.

The motor 130 is controlled by a method similar to a generic control method for a three-phase brushless motor. The rotation direction and the rotational speed are determined by a time-dependent variation of a control signal applied to the coils forming the stator 133.

The motor 130 applies, to the rotation shaft 132, a torque toward an angular position in accordance with control by a controller 180, which is described below. During stop control, one of twelve angular positions, which are arranged at respective angular ranges obtained by dividing one rotation of the rotation shaft 132 into twelve equal parts, is set to be a stop target. Depending on a difference of a signal to be applied to the stator 133, the stop target is determined. Namely, the motor 130 is controlled so that the motor 130 applies, to the rotation shaft 132, a torque toward the set stop target, in response to switching of signals from the outside.

Note that, the same signals are applied to the coil U1 and the coil U2, the same signals are applied to the coil V1 and the coil V2, and the same signals are applied to the coil W1 and the coil W2. Namely, symmetrical signals are applied to the stator 133 every 180 degrees around the center line 135. Additionally, the arrangement of the poles of the rotation shaft 132 is cyclic around the center line 135 with a period of 180 degrees. Accordingly, setting an angular position as a stop target implies setting another angular position that is obtained by rotating the position by 180 degrees around the center line 135 as a stop target. For example, if one of the S-poles is within a range of ±90 degrees from the coil V1 as the center, a torque toward the coil V1 is applied to the one of the S-poles. If the one of the S-poles is outside the range of ±90 degrees from the coil V1 as the center, the one of the S-pole receives a torque toward the coil V2. In this specification, a case is described in which the rotation shaft 132 does not rotate beyond the range of ±90 degrees from the stop target, which is to be sequentially set.

The motor 130 further includes three rotation sensors 134 that are disposed at 60 degree intervals around the center line 135. The rotation sensor 134 is a magnetic sensor, and, more specifically, the rotation sensor 134 is a Hall element utilizing Hall effect. The rotation sensors 134 detect an angular position of the rotation shaft 132. The rotation sensor 134 (HU) is disposed between the coil W2 and the coil U1. The rotation sensor 134 (HV) is disposed between the coil U1 and the coil V1. The rotation sensor 134 (HW) is disposed between the coil V1 and the coil W1.

Based on a pattern of signals output from the three rotation sensors 134, a rotation direction and an angular position of the rotation shaft 132 can be detected. The angular position corresponds to an angle of rotation of the rotation shaft 132. The rotation sensors 134 detects the angular position of the rotation shaft 132 on a basis of a unit of an angular range with a predetermined width. The angular range corresponding to one unit is referred to as a detection range.

As illustrated in FIG. 3, the electromechanical device 100 provided with the controlled motor further includes an elevation shaft 141; a lifting stand 142; and a driven gear piece 143. The elevation shaft 141 is integrally coupled to the operation knob 120, and the elevation shaft 141 integrally rotates with the operation knob 120 around the center line 135. The lifting stand 142 rotatably holds the elevation shaft 141. While the lifting stand 142 is movable in the vertical direction, the lifting stand 142 is restricted by an element, which is not depicted, so that the lifting stand 142 is unable to rotate around the center line 135. The driven gear piece 143 is secured to the lifting stand 142, and the driven gear piece 143 is disposed around the rotation shaft 132. On a surface of the driven gear piece 143 facing the rotation shaft 132, gear grooves are formed that engages with the worm gear of the rotation shaft 132.

When the rotation shaft 132 rotates, the driven gear piece 143 vertically moves without rotating. As the rotation shaft 132 rotates, the driven gear piece 143, the lifting stand 142, the elevation shaft 141, and the operation knob 120 integrally move in the vertical direction. While the driven gear piece 143 and the lifting stand 142 are unable to rotate around the center line 135, the operation knob 120 and the elevation shaft 141 can rotate around the center line 135 in both directions. The operation knob 120 and the elevation shaft 141 can be rotated independently of the rotation of the rotation shaft 132. As the rotation shaft 132 rotates, the worm gear of the rotation shaft 132 and the driven gear piece 143 function as a moving mechanism for moving the operation knob 120 along a predetermined path. The predetermined path is a straight line that is parallel with the center line 135.

The lifting stand 142 is provided with two light shielding pieces, which are a lower light shielding piece 144a and an upper light shielding piece 144b described below (hereinafter, they may be referred to as light shielding pieces 144 without distinction). The lower light shielding piece 144a protrudes downward from a part of the lifting stand 142, and the upper light shielding piece 144b protrudes upward from a part of the lifting stand 142. A movement amount of the light shielding piece 144 in the vertical direction is equal to a movement amount of the operation knob 120.

The electromechanical device 100 provided with the controlled motor further includes a circuit board 150. The circuit board 150 is disposed to partition the space inside the case body 110 in the vertical direction. The circuit board 150 is disposed between the operation knob 120 and the lifting stand 142, and the circuit board 150 is disposed so that the elevation shaft 141 passes through the circuit board 150 without touching it.

The electromechanical device 100 provided with the controlled motor further includes a lower position sensor 151a and an upper position sensor 151b (which may be referred to as the position sensors 151 without distinction, hereinafter). The position sensor 151 is a photo sensor for indirectly detecting a position of the operation knob 120 by detecting the position of the light shielding piece 144. The lower position sensor 151a is disposed on a bottom surface inside the case body 110, and the lower position sensor 151a detects a position of the lower light shielding piece 144a. The upper position sensor 151b is disposed on a lower surface of the circuit board 150, and the upper position sensor 151b detects a position of the upper light shielding piece 144b.

The position sensor 151 defines an internal space having an opening at one of an upper side and a lower side. The position sensor 151 detects whether an object exists in the internal space by light. When the light shielding piece 144 exists inside the internal space, the position sensor 151 is turned on, and when the light shielding piece 144 does not exist inside the internal space, the position sensor 151 is turned off. In the vertical direction, a moving amount of the light shielding piece 144 is equal to a moving amount of the operation knob 120. The position sensor 151 indirectly detects a position of the operation knob 120 through the light shielding piece 144. The operation knob 120 moves in the vertical direction between the retracted position at which the light shielding piece 144 causes the lower position sensor 151a to turn on and the protruding position at which the light shielding piece 144 causes the upper position sensor 151b to turn on.

The electromechanical device 100 provided with the controlled motor further includes an operation detection unit 160 mounted on the circuit board 150. The operation detection unit 160 includes two rotating disks 161 disposed on both sides of the circuit board 150 and an operation amount sensor 162 of the rotating disks 161. The elevation shaft 141 is disposed so that the elevation shaft 141 passes through the rotating disks 161. On a cylindrical side surface of the elevation shaft 141, a groove is formed that extends in the vertical direction, and an engaging piece of the rotating disks 161 engages with the groove of the elevation shaft 141. While the rotating disks 161 are rotatable around the center line 135 by components, which are not depicted, the rotating disks 161 are restricted by the circuit board 150 so that the rotating disks 161 do not move in the vertical direction.

When the elevation shaft 141 moves in the vertical direction, an engaging piece of the rotating disks 161 slides in the groove of the elevation shaft 141, and, thus, the rotating disks 161 do not move in the vertical direction. When the elevation shaft 141 rotates around the center line 135, the engaging piece of the rotating disks 161 is pressed by the groove of the elevation shaft 141, and the rotating disks 161 rotate together with the elevation shaft 141. A rotation amount of the rotating disks 161 is detected by the operation amount sensor 162 that is formed of a magnetic sensor. Namely, the rotation operation of the operation knob 120 is detected by the operation amount sensor 162 through the elevation shaft 141 and the rotating disks 161. Note that the detection method of the rotation operation of the operation knob 120 is not limited to this.

(Control System)

Figure 6:
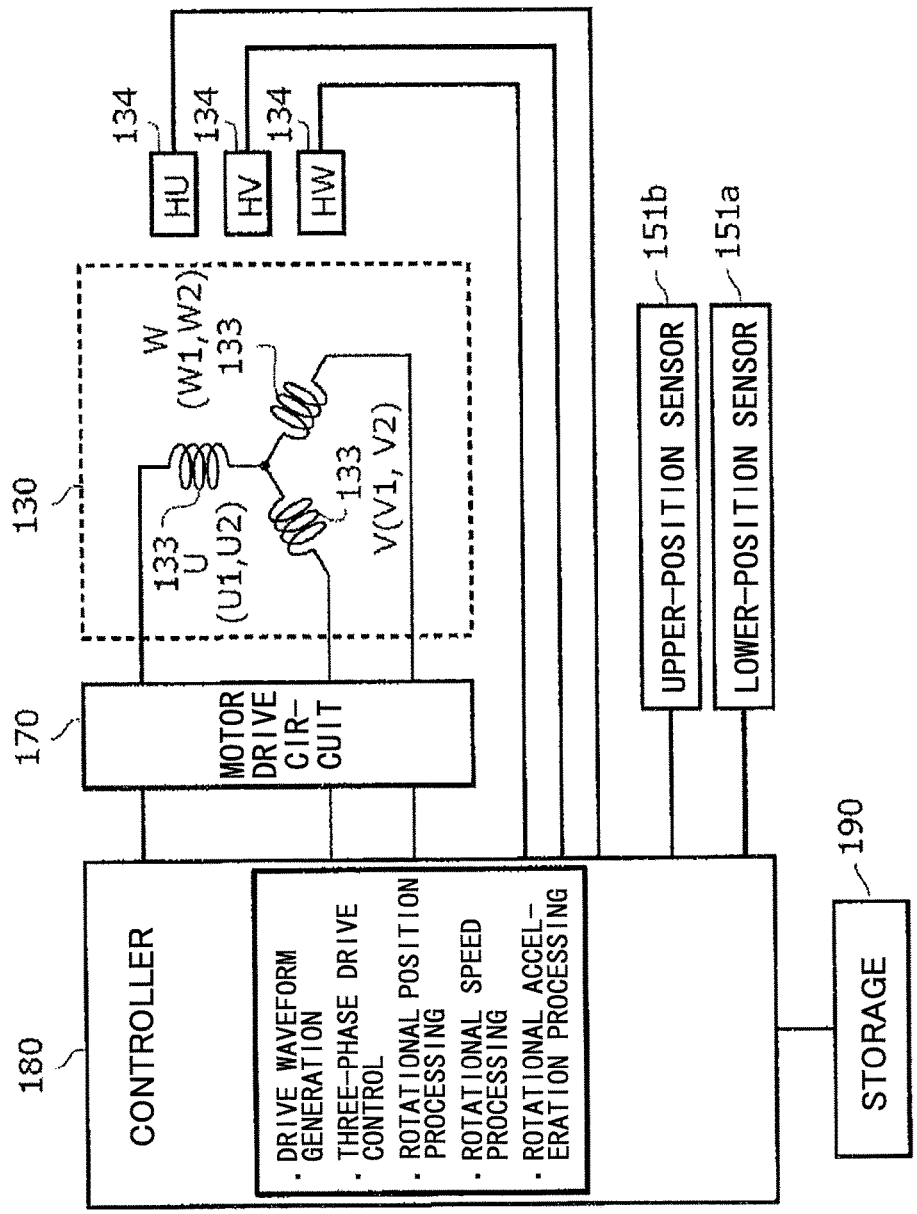
FIG. 6 is a configuration diagram of a control system of the electromechanical device provided with the controlled motor of FIG. 1.

FIG. 6 is a configuration diagram of a control system related to controlling the movement of the electromechanical device 100 provided with the controlled motor in the vertical direction. The electromechanical device 100 provided with the controlled motor is provided with a motor drive circuit 170, a controller 180, and a storage 190 depicted in FIG. 6, which are installed on the circuit board 150 illustrated in FIG. 3.

The motor drive circuit 170 controls the motor 130 based on an indication from the controller 180 to rotate the rotation shaft 132 (FIG. 3) in a desired direction at desired speed, and to stop the rotation shaft 132 (FIG. 3).

The controller 180 is a central processing unit. The storage 190 is, for example, a random access memory (RAM; random access memory). The storage 190 may be another device that can store information.

The controller 180 executes various controls of the electromechanical device 100 provided with the controlled motor by reading and executing a program stored in the storage 190. The controller 180 may be formed of another component, and the controller 180 may be an application specific integrated circuit (ASIC; application specific integrated circuit).

The controller 180 is connected to the motor drive circuit 170, the lower position sensor 151a, the upper position sensor 151b, the rotation sensor 134 (HU), the rotation sensor (HV), and the rotation sensor 134 (HW).

The controller 180 functions as a motor controller by reading and executing a program stored in the storage 190. Additionally, the controller 180 generates drive waveforms and performs three-phase drive control on the motor drive circuit 170. Additionally, the controller 180 executes a process for calculating a rotational position, rotational speed, and rotational acceleration of the rotation shaft 132 based on a detection result from the rotation sensors 134, and the controller 180 generates drive waveforms based on these results.

For causing the rotation shaft 132 to rotate, the controller 180 applies a torque to the rotation shaft 132 so that the rotational speed becomes target rotational speed toward an angular position that is a stop target, based on the angular position of the rotation shaft 132 detected by the rotation sensors 134.

Figure 7:
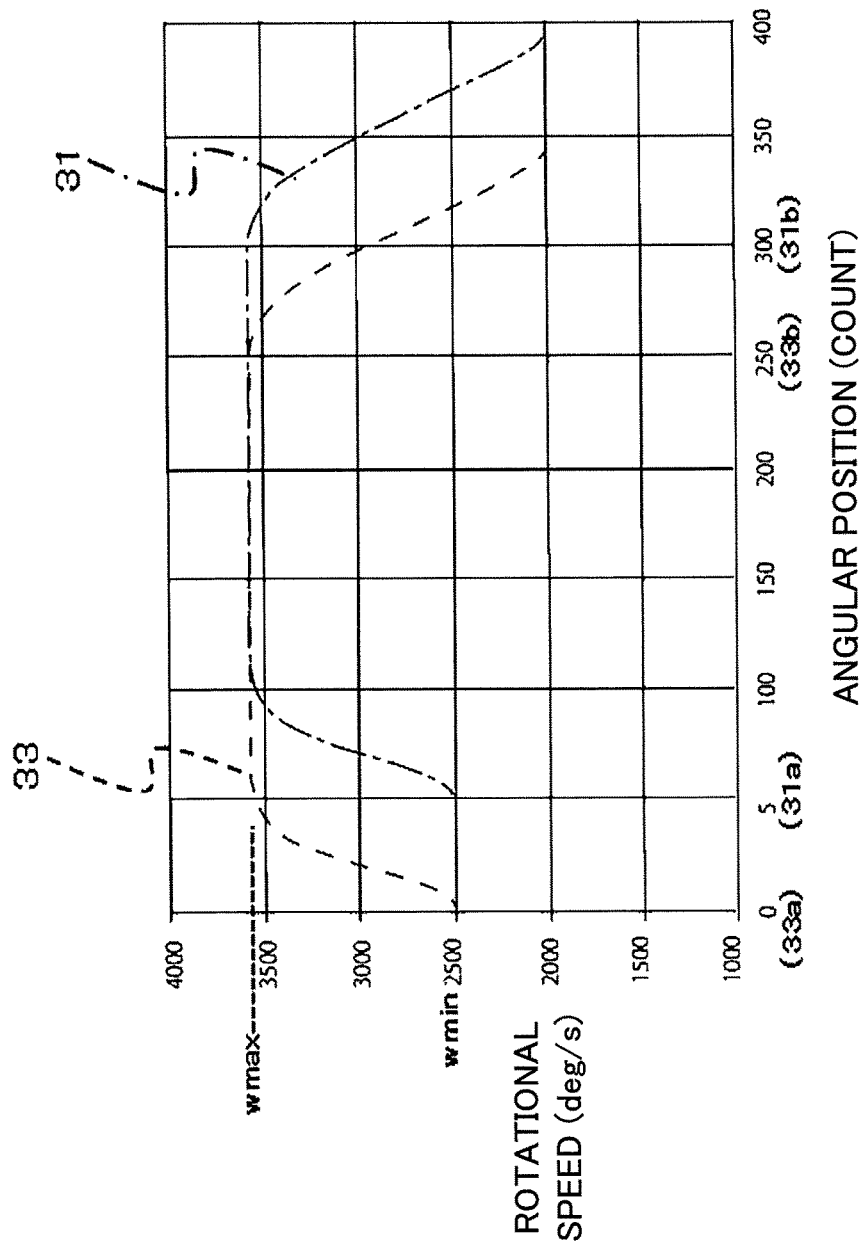
FIG. 7 is a diagram illustrating a relative pattern and an absolute pattern that are used for rotation control of a rotation shaft by a controller, which is depicted in FIG. 6.

FIG. 7 is a diagram illustrating a relative pattern 31 and an absolute pattern 33 used for rotation control of the rotation shaft 132 by the controller 180 illustrated in FIG. 6. Here, the absolute pattern 33 is used for the rotation control of the rotation shaft 132 when the rotation of the rotation shaft 132 starts from a position corresponding to the angular position "0" in FIG. 7. In FIG. 7, the horizontal axis represents a rotational (angle) position of the rotation shaft 132 in terms of a count of the rotation sensors 134, and the vertical axis represents rotational speed (deg/s). In the rotational position of the horizontal axis, "0" is a count at a time at which the operation knob 120 is at the lowermost end (the retracted position illustrated in FIG. 2: the normal rotation start position). As illustrated in FIG. 7, each of the relative pattern 31 and the absolute pattern 33 defines the relation between the angular position and the target rotational speed of the rotation shaft 132. In the embodiment, the target rotational speed defined by the relative pattern 31 is referred to as relative target rotational speed, and the target rotational speed defined by the absolute pattern 33 is referred to as the absolute target rotational speed.

In the embodiment, an angular position (rotational position) between a normal rotation start position 33a that is an angular position of the rotation shaft 132 at a time at which the operation knob 120 is at the retracted position illustrated in FIG. 2 and an angular position of the rotation shaft 132 at a time at which the operation knob 120 is at the protruding position illustrated in FIG. 1 is referred to as a middle start position 31a. If the operation knob 120 stops due to a factor, such as external force, during a process of moving from the retracted position illustrated in FIG. 2 to the protruding position illustrated in FIG. 1, and if the operation knob 120 starts moving again, the movement start position is referred to as the middle start position.

The relative pattern 31 defines the relation between the angular position and the relative target rotational speed of the rotation shaft 132 using the middle start position 31a as a reference. The absolute pattern 33 defines, in advance, the relation between the angular position and the absolute target rotational speed of the rotation shaft 132 using the normal rotation start position 33a as a reference.

Note that, in the embodiment, the relative pattern 31 and the absolute pattern 33 are patterns having the same shapes. The controller 180 creates the relative pattern 31 based on the absolute pattern 33. For example, the controller 180 reads out pattern data of the absolute pattern 33 stored in the storage 190, and the controller 180 creates the relative pattern 31 by processing the absolute pattern 33 so that the middle start position 31a becomes the start position. The data amount can be reduced, as it is unnecessary to maintain patterns from all the middle start positions 31a.

In the relative pattern 31 and the absolute pattern 33, maximum target rotational speed wmax and acceleration from initial rotational speed wmin until the maximum target rotational speed wmax is reached are the same. Additionally, the middle start position 31*a* that is an increment start angular position of the relative target rotational speed in the relative pattern 31 is greater than the normal rotation start position 33*a* that is an increment start angular position of the absolute target rotational speed in the absolute pattern. Additionally, a decrement start angular position 31*b* from the maximum target rotational speed wmax of the relative target rotational speed in the relative pattern 31 is greater than a decrement start angular position 33*b* from the maximum target rotational speed of the absolute target rotational speed in the absolute pattern 33. In the embodiment, the shapes of the relative pattern 31 and the absolute pattern 33 are the same, and the increment start angular positions are shifted.

The relative pattern 31 and the absolute pattern 33 are defined so that all the required specifications on a target position arrival time from the normal rotation start position 33*a* to a normal rotation end position of the operation knob 120, noise, a stopping precision, and a drive electric current can be satisfied. Each of the relative pattern 31 and the absolute pattern 33 may be implemented, for example, as table data stored in the storage 190, or may be implemented as a function for outputting the target rotational speed using the rotational position as a variable.

When the rotation shaft 132 starts rotation from the normal rotation start position 33*a*, namely, when the operation knob 120 moves upward from the retracted position illustrated in FIG. 2, the controller 180 operates in an absolute mode such that the controller 180 identifies the absolute rotational speed corresponding to the angular position detected by the rotation sensors 134 using the absolute pattern 33 illustrated in FIG. 7, and the controller 180 controls the rotation of the rotation shaft 132 so that the identified absolute rotational speed is achieved.

When the rotation shaft 132 start rotation from the middle start position 31*a*, namely, when the operation knob 120 moves upward from a position between the retracted position illustrated in FIG. 2 and the protruding position illustrated in FIG. 1, the controller 180 operates in a relative mode such that the controller 180 identifies the relative target rotational speed corresponding to the angular position detected by the rotation sensors 134 using the relative pattern 31 illustrated in FIG. 7, and the controller 180 controls the rotation of the rotation shaft 132 so that the identified relative rotational speed is achieved.

Figure 8:
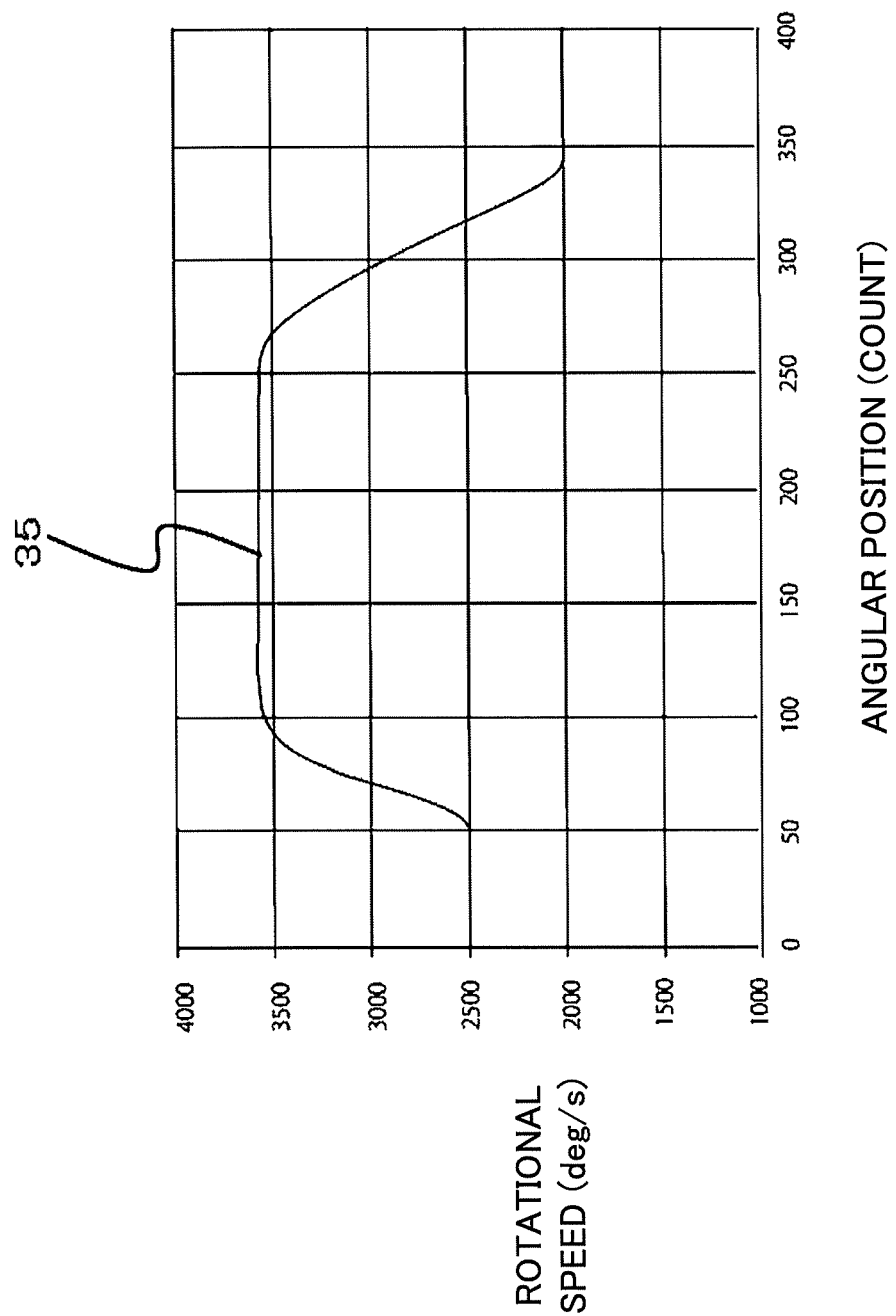
FIG. 8 is a diagram illustrating a pattern for speed control, which is newly created by switching operation of the controller depicted in FIG. 6.

Additionally, while controlling the rotation of the rotation shaft 132 in the relative mode, the controller 180 identifies the absolute rotational speed corresponding to the angular position detected by the rotation sensors 134 using the absolute pattern 33. Then, if a condition is not satisfied such that the identified absolute rotational speed is greater than the relative target rotational speed identified corresponding to the detected angular position, the controller 180 switches the rotation control mode from the relative mode to the absolute mode. As a result, as illustrated in FIG. 8, the rotational speed corresponding to the angular position detected by the rotation sensors 134 can be identified using a new dynamic pattern 35, and the rotation of the rotation shaft 132 can be properly controlled so that the identified rotational speed is achieved.

Figure 9:
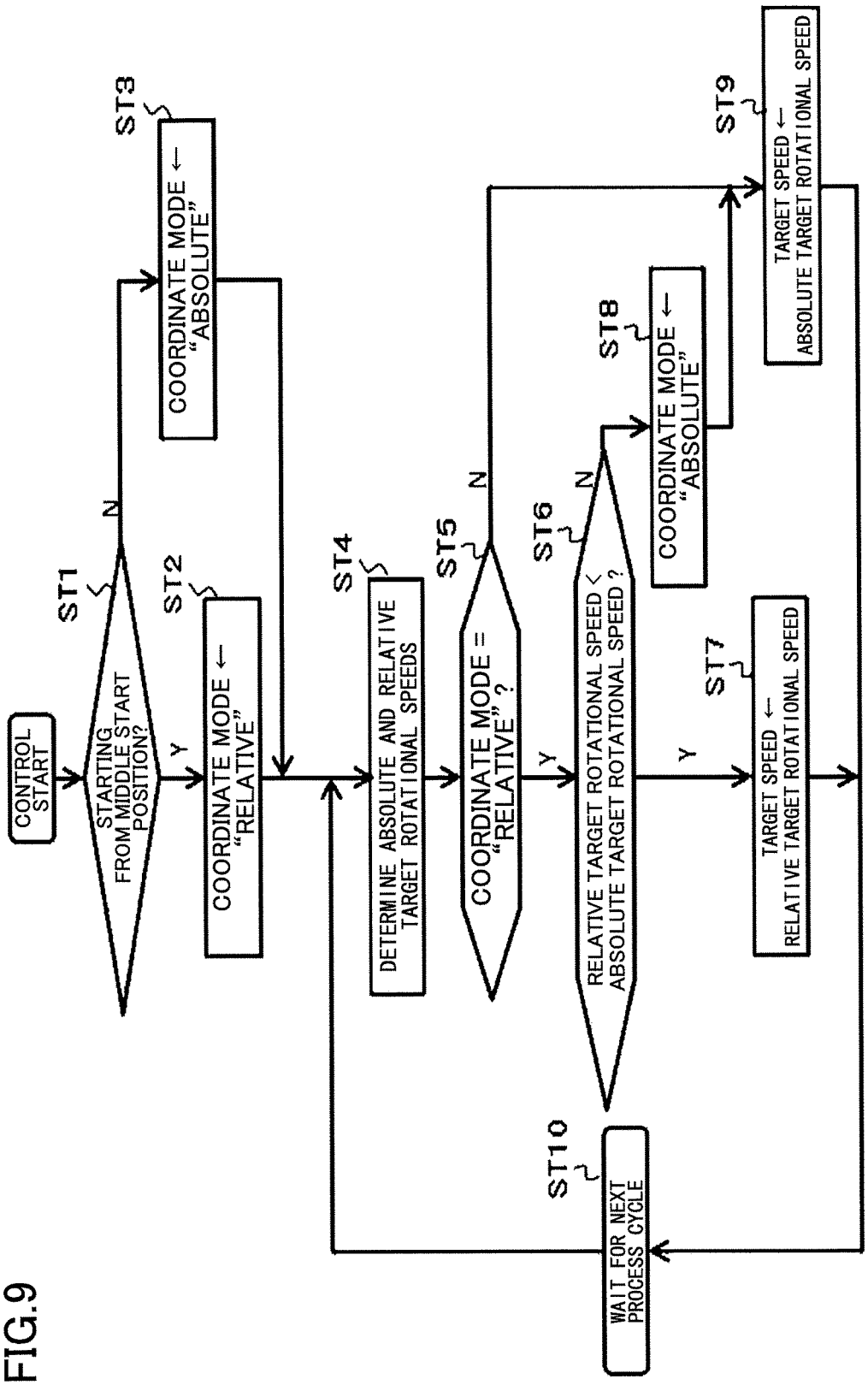
FIG. 9 is a flowchart illustrating a rotation control method of a rotation shaft by the controller depicted in FIG. 6.

The rotation control method of the rotation shaft 132 by the controller 180, which is depicted in FIG. 6, is described below. FIG. 9 is a flowchart illustrating the rotation control method of the rotation shaft 132 by the controller 180 depicted in FIG. 6.

Step ST1:
The controller 180 determines whether the lifting operation of the operation knob 120 is from the middle start position, based on a detection result of the position sensor 151. The controller 180 moves to step ST2, if the determination is positive, and the controller 180 moves to step ST3, if the determination is negative.

Step ST2:
The controller 180 sets the rotation control mode to the relative mode. At this time, for example, the counter value of the rotation sensors 134 at the time at which the lifting operation of the operation knob 120 is stopped last time is used as the middle start position 31*a*.

Step ST3:
The controller 180 sets the rotation control mode to the absolute mode. At this time, the count value "0" of the rotation sensors 134 at the retracted position illustrated in FIG. 2 is the normal rotation start position 33*a*.

Step ST4:
In the relative mode, the controller 180 identifies, using the relative pattern 31, the relative target rotational speed corresponding to the angular position detected by the rotation sensors 134. Additionally, the controller 180 identifies, using the absolute pattern 33, the absolute target rotational speed corresponding to the angular position detected by the rotation sensors 134.

Step ST5:
If the rotation control mode is the relative mode, the controller 180 moves to step ST6, and if the rotation control mode is the absolute mode, the controller 180 moves to step ST9.

Step ST6:
The controller 180 determines whether the absolute rotational speed is greater than the relative target rotational speed identified at step ST4. If the determination is positive, the controller 180 moves to step ST7, and if the determination is negative, the controller 180 moves to step ST8.

Step ST7:
The controller 180 controls the rotation of the rotation shaft 132 using the relative target rotational speed identified at step ST4 as the target speed.

Step ST8:
The controller 180 switches the rotation control mode from the relative mode to the absolute mode.

Step ST9:
The controller 180 controls the rotation of the rotation shaft 132 using the absolute target rotational speed identified at step ST4 as the target speed.

Step ST10:
The controller 180 waits for a predetermined processing cycle after completing the process of step ST7 or step ST9, and, then, returns to the process of step ST4.

As described above, when the rotation start position of the rotation shaft 132 is the middle start position 31*a* (namely, when the rotation of the rotation shaft 132 is stopped in the middle, and, then, the rotation is restarted), the electromechanical device 100 provided with the controlled motor according to the embodiment defines the target rotational speed (the relative target rotational speed) using the relative pattern 31 for which the middle start position 31*a* is used as the reference, instead of using the absolute pattern 33 that is defined using the normal rotation start position 33*a* as the reference.

Figure 10:
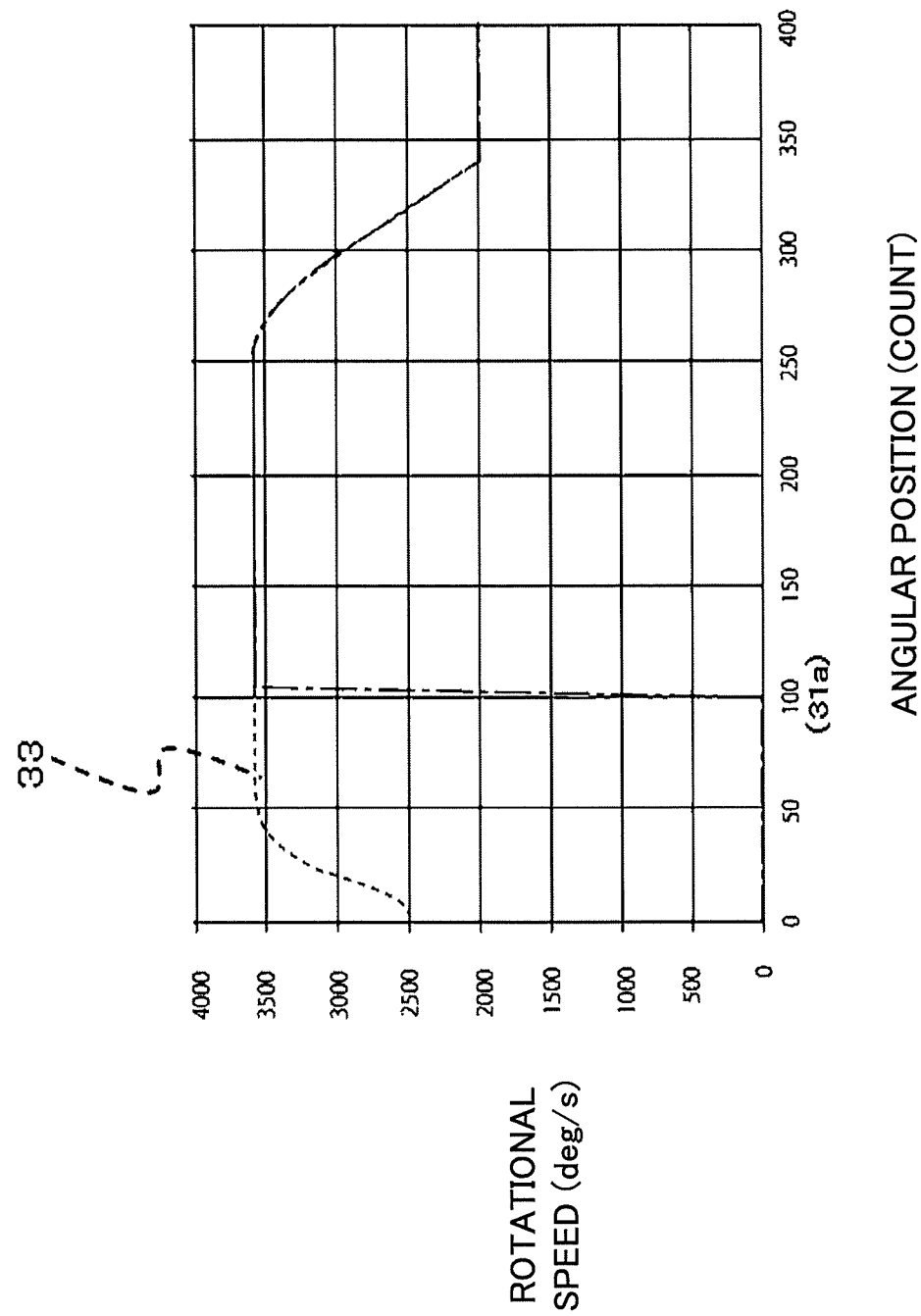
FIG. 10 is a diagram illustrating a target rotational speed control in an electromechanical device provided with a controlled motor according to related art.

As described above, when the rotation is restarted from the middle start position 31*a*, by using the relative pattern 31 illustrated in FIG. 7, the relative target rotational speed, which is low speed, can be used at the middle start position 31*a*, and thereby a large electric current can be prevented from flowing and a speed tracking error can be reduced, without using the absolute target rotational speed, which is high speed, defined by the absolute pattern 33, as illustrated in FIG. 10. Additionally, required specification for the drive circuit can be lowered. Additionally, if a gear, etc., is connected to the rotation shaft 132, it can be suppressed that a large torque is rapidly generated and the gear starts rotating at high speed, so that collision sound can be suppressed. Namely, if the absolute pattern 33 is used at the middle start position 31a, the acceleration curve characteristic is insufficient at the time of restarting the rotation, and the initial target rotation speed becomes large. According to the electromechanical device 100 provided with the controlled motor, such a problem can be resolved.

Further, according to the electromechanical device 100 provided with the controlled motor, while the rotation control is performed using the relative pattern 31, if it is detected that a condition is not satisfied such that the absolute target rotational speed corresponding to the angular position detected by the rotation sensors 134 is greater than the relative target rotational speed, the motor control is switched so that the absolute pattern 33 is used. Accordingly, after the relative target rotational speed reaches the absolute target rotational speed, the target rotational speed can be made equal to that of a case in which the rotation of the rotation shaft 132 does not stop in the middle. As a result, the target rotational speed in the vicinity of the position at which the rotation is stopped can be made constant.

Furthermore, in the electromechanical device 100 provided with the controlled motor, if it is determined that the rotation start position of the rotation shaft 132 is the normal rotation start position 33a based on the detection result by the rotation sensors 134, the controller 180 controls the motor 130 using the absolute pattern 33 so that the absolute target rotational speed corresponding to the detected angular position can be achieved. As a result, if the rotation start position of the rotation shaft 132 is the normal rotation start position 33a, the motor 130 can be controlled using the absolute pattern 33, without using the relative pattern 31.

Furthermore, in the electromechanical device 100 provided with the controlled motor, the maximum target rotational speed and the acceleration until the maximum target rotational speed is reached are the same for the relative pattern 31 and the absolute pattern 33, which are depicted in FIG. 7. As a result, even if the relative pattern 31 and the absolute pattern 33 are switched, the change in the target rotational speed can be smoothed.

Further, as illustrated in FIG. 7, in the electromechanical device 100 provided with the controlled motor, the increment start angular position of the relative target rotational speed in the relative pattern 31 (the middle start position 31a) is greater than the increment start angular position of the absolute target rotational speed in the absolute pattern 33 (the normal rotation start position 33a), and the decrement start angular position 31b from the maximum target rotational speed of the relative target rotational speed in the relative pattern 31 is greater than the decrement start angular position 33b from the maximum target rotational speed of the absolute target rotational speed in the absolute pattern 33. As a result, the relative target rotational speed that is lower than the absolute target rotational speed defined by the absolute pattern 33 can be used at the middle start position 31a, and thereby a large electric current can be prevented from flowing and the speed tracking error can be reduced.

Further, in the electromechanical device 100 provided with the controlled motor, the relative pattern 31 is created using the absolute pattern 33. Further, in the electromechanical device 100 provided with the controlled motor, the relative pattern 31 and the absolute pattern 33 have the same shapes. As a result, it is unnecessary to prepare relative patterns 31 for all the middle start positions 31a, and it can be implemented by a simple and inexpensive configuration. Further, if the rotation is restarted from the middle start position 31a, a rotational acceleration pattern can be achieved that is the same as that of a case in which the rotation is started from the normal rotation start position 33a.

The present invention is not limited to the above-described embodiment. Namely, a person ordinarily skilled in the art may make various modifications, combinations, sub-combinations, and substitutions for the components of the above-described embodiment within the technical scope of the present invention or the equivalent thereof. In the above-described embodiment, a case is exemplified in which the operation knob 120 moves from the retracted position illustrated in FIG. 2 to the protruding position illustrated in FIG. 1; however, it can be similarly applied to a case in which the operation knob 120 moves from the protruding position illustrated in FIG. 1 to the retracted position illustrated in FIG. 2. In this case, the protruding position illustrated in FIG. 1 is the normal rotation start position 33a.

The present disclosure can be applied to various electromechanical devices in which various components are moved by rotation of rotation shafts of motors. For example, it can be applied to shift devices that are installed in various vehicles, such as an automobile, an aircraft, and a ship.

DESCRIPTION OF THE REFERENCE NUMERALS

31: relative pattern
31a: middle start position
31b: decrement start angular position
33: absolute pattern
33a: normal rotation start position
33b: decrement start angular position
35: dynamic pattern
100: electromechanical device provided with controlled motor
120: operation knob
130: motor
132: rotor
133: stator
134: rotation sensor
144: light shielding piece
144a: lower light shielding piece
144b: upper light shielding piece
145: tip
151: position sensor
151a: lower position sensor
151b: upper position sensor
170: motor drive circuit
180: controller
190: storage
wmax: maximum target rotational speed
wmin: initial rotational speed

What is claimed is:
1. An electromechanical device comprising:
a motor that includes a rotation shaft and that applies, to the rotation shaft, a torque toward an angular position in accordance with control;
a rotation sensor that detects the angular position of the rotation shaft; and a motor controller that controls rotational speed of the rotation shaft depending on the angular position detected by the rotation sensor, wherein the motor controller determines, based on a detection result by the rotation sensor, whether a rotation start position of the rotation shaft is a predetermined normal rotation start position, wherein, upon determining that the rotation start position is a middle start position other than the normal rotation start position, the motor controller identifies the relative target rotational speed corresponding to the detected angular position using a relative pattern that defines, using the middle start position as a starting point of the relative pattern, relations between the angular position and relative target rotational speed, and the motor controller controls the rotational speed of the rotation shaft using the identified relative target rotational speed, and the motor controller uses an absolute pattern that defines, using the normal rotation start position as a starting point of the absolute pattern, relations between the angular position and an absolute target rotational speed to identify the absolute target rotational speed corresponding to the detected angular position, wherein, upon detecting that a condition that the identified absolute target rotational speed is greater than the relative target rotational speed corresponding to the detected angular position is not satisfied, the motor controller controls the rotational speed of the rotation shaft using the identified absolute target rotational speed, and the motor controller generates the relative pattern based on the absolute pattern in a way that the relative pattern and the absolute pattern have an identical shape at all middle start positions.

2. The electromechanical device according to claim 1, wherein, upon determining that the rotation start position of the rotation shaft is the normal rotation start position based on the detection result by the rotation sensor, the motor controller controls the rotational speed of the rotation shaft using the identified absolute target rotational speed achieved.

3. The electromechanical device according to claim 1, further comprising:
   an operation knob; and
   a moving system that moves the operation knob along a predetermined path as the rotation shaft rotates,
   wherein a transmission is switched by the operation knob.

4. A motor control method for controlling rotational speed of a motor that includes a rotation shaft and that applies, to the rotation shaft, a torque toward an angular position in accordance with control, the motor control method comprising:
   determining, based on a detection result by a rotation sensor that detects the angular position of the rotation shaft, whether a rotation start position of the rotation shaft is a predetermined normal rotation start position, wherein, upon determining that the rotation start position is a middle start position other than the normal rotation start position, identifying the relative target rotational speed corresponding to the detected angular position using a relative pattern that defines, using the middle start position as a starting point of the relative pattern, relations between the angular position and relative target rotational speed, and controlling the rotational speed of the rotation shaft using the identified relative target rotational speed;
   identifying the absolute target rotational speed corresponding to the detected angular position, using an absolute pattern that defines, using the normal rotation start position as a starting point of the absolute pattern, relations between the angular position and an absolute target rotational speed; and
   upon detecting that a condition that the identified absolute target rotational speed is greater than the relative target rotational speed corresponding to the detected angular position is not satisfied, controlling the rotational speed of the rotation shaft using the identified absolute target rotational speed,
   wherein the relative pattern is generated based on the absolute pattern in a way that the relative pattern and the absolute pattern have an identical shape at all middle start positions.

* * * * *